US000001086H

United States Statutory Invention Registration [19]

[11] Reg. Number: H1086

Otooni

[43] Published: Aug. 4, 1992

[54] COLLISION CENTRIFUGAL ATOMIZATION UNIT

[75] Inventor: Monde A. Otooni, Glassboro, N.J.

[73] Assignee: The United States of America as represented by the Secretary of the Army, Washington, D.C.

[21] Appl. No.: 832,266

[22] Filed: Feb. 7, 1992

[51] Int. Cl.[5] ..... C22F 9/08

[52] U.S. Cl. ..... 75/338; 75/339

*Primary Examiner*—Brooks H. Hunt
*Assistant Examiner*—Daniel J. Jenkins
*Attorney, Agent, or Firm*—Anthony T. Lane; Edward Goldberg; Edward F. Costigan

[57] ABSTRACT

Apparatus and a method for producing submicron and smaller metal alloy particles using a main chamber having a longitudinal axis and a feeder for introducing a quantity of molten alloy under pulsed gas pressure in a direction generally radial to the axis. The feeder has a gas stream for forming metal droplets from said alloy. A gas accelerator directs axially flowing gas against the droplets from the feeder in the chamber. The accelerator directs the droplets in an axial direction to a substrate located along the axis and in the direction of flow from the accelerator to receive the droplets at a predetermined distance from the feeder, whereby the particles are produced.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COLLISION CENTRIFUGAL ATOMIZATION UNIT

GOVERNMENTAL INTEREST

The invention described herein may be manufactured, used, and licensed by or for the Government for Government purposes without payment to me of any royalties thereon.

FIELD OF THE INVENTION

The present invention relates to apparatus for producing amorphous and ultra fine rapidly solidified alloys, and more particularly to apparatus and a method for producing such alloys as small as submicron or smaller sized particles.

BACKGROUND OF THE INVENTION

Ever since the beginning of rapid solidification technology became into being and began to be used, there have been several major problems which have prevented full industrial acceptance of the process. Apparatus has not been available which produces the products as they have been envisioned in the laboratory and in theory.

Primarily, the prior art methods and apparatus produce a microstructure which is not at all uniform. Grain size and dimensions are far too large at at the present time. At its simplest, the problem is stated as the lack of know how to produce near net shape product.

In prior art methods and apparatus, the atomization process produces droplets of varying size on any given substrate. In present systems, as deposition takes place, the length of the droplet trajectory becomes varied. Consequently, the thermal history of the deposit will not be the same throughout the specimen.

One important feature of the process of atomizing alloys is that it is necessary to control the flow parameters such as velocity and configuration of flow lines in order to cause collisions of higher intensity and thereby produce finer particles. To date, that has not been effective.

Accordingly, it is an object of this invention to produce new apparatus for producing ultra fine to amorphous alloys with uniform microstructures.

Another object of this invention is to provide apparatus for producing a near net shape, rapidly solidified alloys in bulk quantity.

Yet another object of the present invention is to provide apparatus for such a product in which subsequent annealing and changing the microstructures of the specimen when desired becomes feasible.

Other objects will appear hereinafter.

SUMMARY OF THE INVENTION

It has now been discovered that the above and other objects of the present invention may be accomplished in the following manner. Specifically, a new apparatus for manufacturing submicron metal alloy products of the type described has been discovered, and a method of making these products using the apparatus.

The apparatus of this invention includes a feeder unit in which liquid metal from a melt pool is interjected into a chamber in a vertical direction with respect to the length of the chamber from an atomizing circular nozzle with its attendant gas pressure.

At the same time, gas flow accelerators introduce high velocity gas axially along the chamber. The molten liquid alloy is subjected to several strong forces which form it into atomized powder. This ultra fine dispersion is then impacted on a rotating, cooled substrate. In the preferred embodiment, the substrate is provided with means to translate the location of the substrate axially in order to maintain an exact and same line of particle flight during deposition of the alloy on the substrate.

The alloy is finely dispersed in the chamber as a result of many forces which all act cooperatively to form the ultra small particles. Submicron sizes are readily achievable by this invention. The alloy comes in a molten state from the liquid metal reservoir and is met with a gas stream and and ultrasonically pulsed jets of gas from the circular nozzle. As this atomized powder enters vertically or radially with respect to the axis, it is impacted with gas flowing under controlled acceleration conditions. The droplets are accelerated and undergo many collisions with each other, further reducing the particle size.

Finally, as the particles or droplets impact on the target substrate, under controlled conditions of flight length, they are further subject to shear by the centrifugal force of the substrate as it rotates about the axis of the chamber.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The apparatus of the present invention includes four basic parts. The alloy in introduced into the apparatus by a feeder. The feeder has associated with it various gas nozzles. The alloy is fed into the main chamber, atomized and is interacted with a gas flow accelerator. The droplet alloy then impacts on a rotating substrate with its associated cooling and translation facilities.

The unit provides for submicron or even smaller metal droplets which are produced as a result of these several on going processes in the main chamber. As will be shown, a series of of serially positioned vertical or radial nozzles atomize the metal droplets. The chamber is preferably cylindrical and has an axis which defines the vertical or radial direction of the inlet nozzles.

The entering droplets, moving as a result of controlled gas pressure, will then be subjected to a transporting high pressure gas flow emanating from a series of coaxially positioned gas flow nozzles from the end or base of the cylinder or chamber. Inert gas, such as nitrogen, helium or argon causes collision and shearing and transportation of the metal droplets.

The droplets are controlled accurately by the gas flow parameters and will experience production, collision and motions in several directions. The controlled droplets are then deposited on a rotating, cooled axially moving substrate. The purpose of the axial translation is to keep the distance of the source to the deposition place or substrate always constant. This results in production of either a near net-shaped specimens and/or the desired particle size. The rotation of the substrate will cause centrifugally generated forces to shear the depositing droplets to shear further during impact with the substrate.

Figure 1:
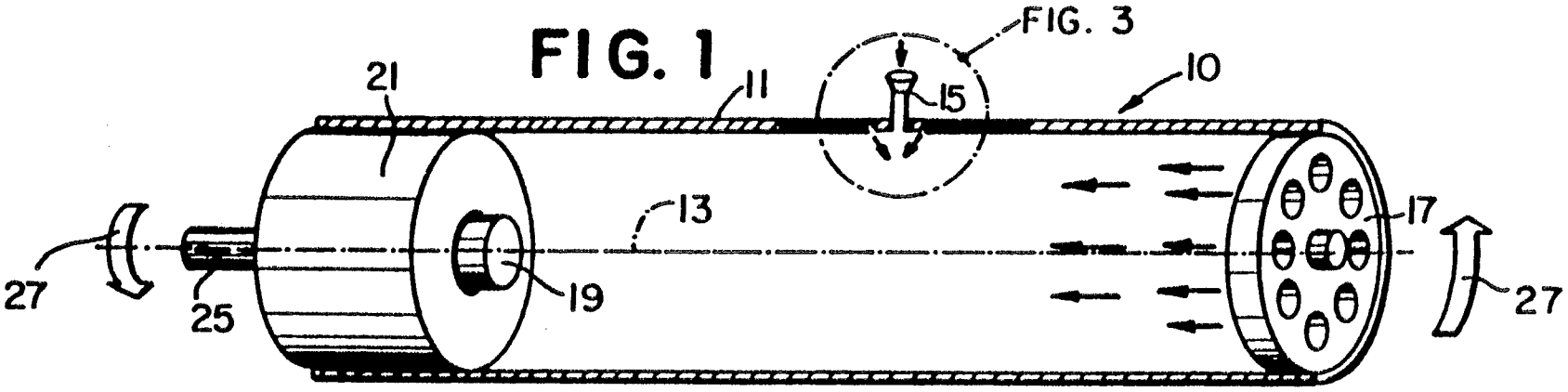
FIG. 1 illustrates a side elevational view, partially in section, of the chamber and the preferred embodiment, showing a revolving nozzle on one end and, in partial section, the cooled substrate unit on the other end of the chamber.

Turning now to FIG. 1, the device shown generally by reference number 10 includes a chamber 11, shown in the preferred embodiment as a cylinder having a longitudinal axis 13. Chamber 11 has a feeder unit 15 which brings the molten alloy into the chamber as will be described below. Chamber 11 has a gas flow accelerator at one end, comprising a perforated disc 17 which houses gas nozzles to inject the inert gas as described above. Disc 17 provides a source of gas which accelerates the droplets of alloy from feeder unit 15 and causes collisions between particles as well as controlling the velocity of the particles as they move toward substrate 19 at the other end of chamber 11.

Substrate 19 forms one part of the end unit, as all of the alloy being atomized is directed on to the surface 19. Outer shell 21 provides support and mounts the substrate 19 in chamber 11, and at the same time incloses liquid nitrogen cooling coils 23. The liquid nitrogen, which is the preferred cooling means, is formed as a reservoir at the back of substrate 19, so that it is maintained at a constant temperature.

Substrate 19 is mounted at its other end to shaft 25 and shaft 25 rotates in the direction of arrow 27 to impart the centrifugal forces to the impinging droplets as described above. Shaft 25 is also adapted to move axially along axis 13 to adjust or maintain the precise location of the surface of substrate 19 as the bulk production of rapidly solidified materials takes place. This insures that the particle line of flight is kept constant during deposition of alloy.

The other end 17 of chamber 11 is also rotating in the direction of arrow 27, and this rotation is independently controlled to control the collision and acceleration of droplets in chamber 11. As the alloy enters from feeder unit 15, it is subjected to these forces, substantially improving the operation of the process and apparatus.

Figure 3:
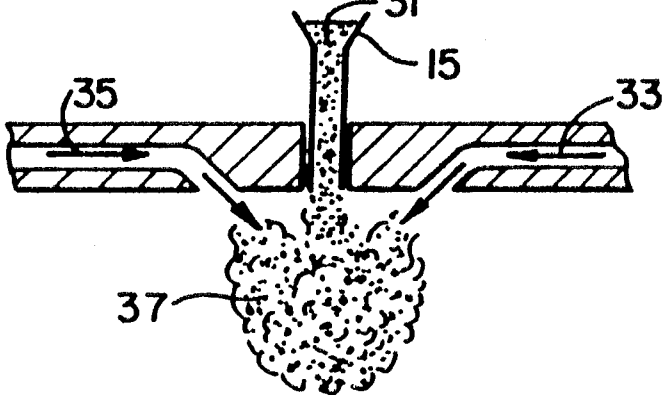
FIG. 3 illustrates a greatly enlarged, schematic view of the feed unit of FIG. 1 and shown in the dot and dash circle and labeled FIG. 3.
Figure 2:
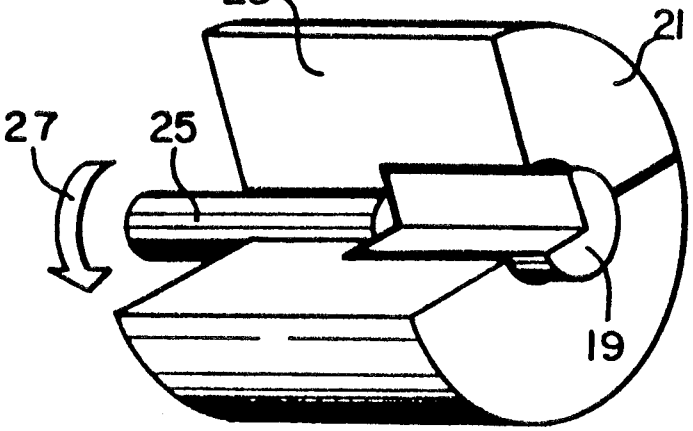
FIG. 2 illustrates an enlarged, side elevational view, partially cut away, of the substrate unit of the chamber of FIG. 1.

Turning now to FIG. 3, the action of the feeder unit is seen in greater detail. Feeder unit 15 has a main feeder tube 31 where liquid metal is transferred from a reservoir where the metal is maintained at the proper temperature. The metal is subjected to a gas stream 33 of the same type as used in disc 17 and the nozzles associated therewith. Gas in gas stream 33 causes particle formation and moves the droplets into chamber 11.

Also impinging on the droplets in this unit is an ultrasonically pulsed jet of gas 35 which serves to introduce the droplets into the chamber. The cooperative effect of gas stream 33 and pulsed gas jet 35 causes the molten alloy to form an atomized powder 37. As powder 37 enters fully into chamber 11, gas from disc 17 acts to further reduce the size of the particles or droplets. First there is a collision of primary droplets, caused by gas from disc 17. Then there is the formation of secondary, smaller droplets as the primary droplets hit substrate 19. In this manner, the microstructures produced as superior to any produced by known methods.

The equipment operates as follows. The feeder units 15, and there may be four or eight or other numbers of units surrounding the chamber 11, will be heated to the required temperature to produce required alloy melt. The circular jet nozzles in disc 17 will be activated prior to allowing the droplets to enter chamber 11. Substrate 19, which has been cooled by liquid nitrogen coils 23 begins to rotate about shaft 25, and is maintained at a predetermined rpm. The feeder valves are opened and the final submicron or smaller products are produced in bulk. Shaft 25 not only rotates but maintains the alignment of substrate 19 in relation to the feeder unit 15 to maintain precision in production.

While particular embodiments of the present invention have been illustrated and described, it is not intended to limit the invention, except as defined by the following claims.

What is claimed is:

1. The method of producing submicron and smaller metal alloy particles, comprising the steps of:

providing a main chamber means having a longitudinal axis;

introducing a quantity of molten alloy under pulsed gas pressure in a direction generally radial to said axis, and forming metal droplets from said alloy by said gas;

directing axially flowing gas against said droplets in said chamber in an axial direction; and impacting said droplets on a substrate located along said axis and in the direction of flow of gas at a predetermined distance from said feeder means, whereby said particles are produced.

2. The method of claim 1, wherein said substrate is cooled to a low temperature.

3. The method of claim 2, wherein said cooling is from liquid nitrogen coils.

4. The method of claim 1, wherein said substrate is rotated to impart centrifugal force to droplets impinging on said substrate.

5. The method of claim 1, which further includes adjusting the distance between said substrate and said feeder means to maintain said predetermined distance.

6. The method of claim 1, which further includes ultrasonically pulsing gas to form said droplets as said droplets are introduced into said chamber.

* * * * *